United States Patent
Guy et al.

(10) Patent No.: US 12,054,962 B2
(45) Date of Patent: Aug. 6, 2024

(54) POOL PUMP DISPENSERS

(71) Applicant: King Technology Inc., Hopkins, MN (US)

(72) Inventors: David Guy, Maple Grove, MN (US); Jeffrey D Johnson, Edina, MN (US); Brett Libby, Edina, MN (US)

(73) Assignee: KING TECHNOLOGY, INC., Minnetonka, MN (US)

( * ) Notice: Subject to any disclaimer, the term of this patent is extended or adjusted under 35 U.S.C. 154(b) by 78 days.

(21) Appl. No.: 17/687,946

(22) Filed: Mar. 7, 2022

(65) Prior Publication Data

US 2022/0282509 A1     Sep. 8, 2022

Related U.S. Application Data

(60) Provisional application No. 63/207,570, filed on Mar. 8, 2021.

(51) Int. Cl.
| | |
|---|---|
| *E04H 4/12* | (2006.01) |
| *C02F 1/50* | (2023.01) |
| *C02F 1/52* | (2023.01) |
| *C02F 103/42* | (2006.01) |

(52) U.S. Cl.
CPC .......... *E04H 4/1281* (2013.01); *E04H 4/1272* (2013.01); *C02F 1/50* (2013.01); *C02F 1/52* (2013.01); *C02F 2103/42* (2013.01)

(58) Field of Classification Search
CPC . E04H 4/1281; E04H 4/1272; C02F 2103/42; C02F 1/50; C02F 1/52
USPC ............................................ 210/167.11, 749
See application file for complete search history.

(56) References Cited

U.S. PATENT DOCUMENTS

| | | | |
|---|---|---|---|
| 3,930,834 A | | 1/1976 | Schulteis et al. |
| 4,780,216 A | * | 10/1988 | Wojtowicz .............. C02F 1/722 |
| | | | 424/661 |
| 4,952,398 A | | 8/1990 | Tapin |
| 5,810,999 A | | 9/1998 | Bachand et al. |
| 6,149,821 A | * | 11/2000 | Rounds ..................... C02F 1/50 |
| | | | 210/764 |
| 7,419,590 B2 | | 9/2008 | King et al. |
| 9,663,964 B2 | | 5/2017 | Kurani |
| 2005/0194296 A1 | | 9/2005 | Lin |
| 2014/0221208 A1 | | 8/2014 | Hargrove et al. |
| 2018/0255785 A1 | | 9/2018 | Unhoch et al. |

FOREIGN PATENT DOCUMENTS

| | | | | |
|---|---|---|---|---|
| EP | 0494373 A1 | * | 7/1992 | |
| GB | 2158060 A | * | 11/1985 | ............ B01F 1/0027 |
| GB | 2197861 A | * | 6/1988 | ............. C02F 1/505 |
| TW | 201809030 A | * | 3/2018 | |
| WO | 2006093556 A2 | | 9/2006 | |

OTHER PUBLICATIONS

Machine-generated English translation of TW 201809030, generated on Oct. 15, 2023.*
International Search Report and Written Opinion for related application PCT/US2022/019091, 11 pages, Sep. 9, 2022.

* cited by examiner

*Primary Examiner* — Fred Prince
(74) *Attorney, Agent, or Firm* — FREDRIKSON & BYRON, P.A.

(57) ABSTRACT

A method and dispenser for maintaining a body of water in a swimming pool free of algae with the dispenser water mateable to a surface within a pool pump basket to deliver at least one dispersant to the pool water flowing through the pool pump basket.

19 Claims, 2 Drawing Sheets

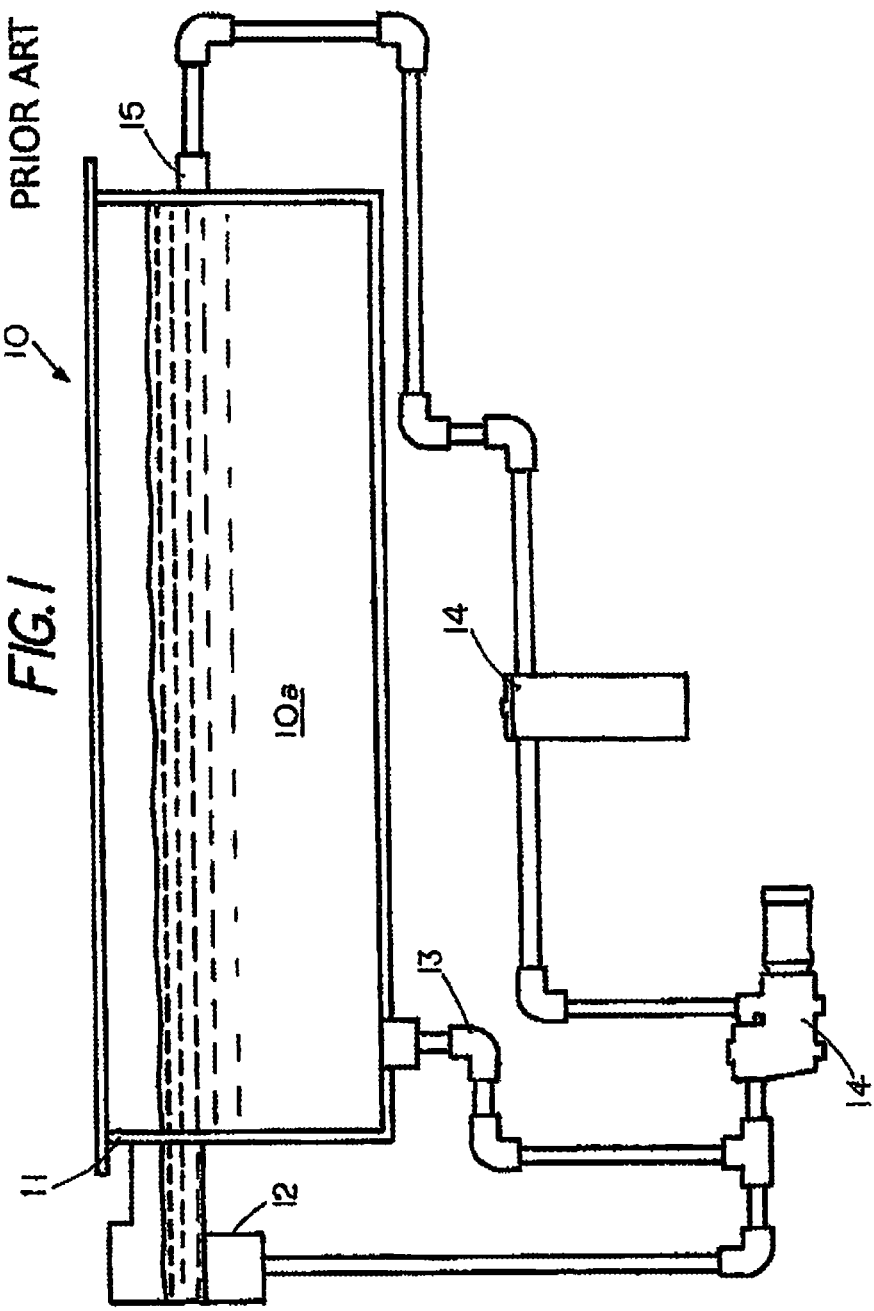

POOL PUMP DISPENSERS

CROSS REFERENCE TO RELATED APPLICATIONS

This application claims priority to currently U.S. Provisional Application Ser. No. 63/207,570; filed Mar. 8, 2021.

FIELD OF THE INVENTION

This invention relates generally to recreational bodies of water such as swimming pools and, more specifically, to a basket dispenser where a single or multiple dispersants can be dispensed into the body of water through a free standing dispenser located in the pool pump basket.

BACKGROUND OF THE INVENTION

One aspect of maintaining a swimming pool is to avoid the growth or outbreak of algae in the pool water i.e. an algae bloom, which one avoids by adding an algaecide to the pool water. One of the most effective algaecides is copper, which may be combined with a chelating agent to decrease staining.

One of the challenges in using copper as an algaecide (for example copper sulfate) is to avoid unsightly copper stains on the pool structure since copper stains the pool structure if one allows the copper to remain in contact with the pool structure. Other factors may also cause copper staining including improper water balance, for example the pH of the pool water is to high.

Typically, copper algaecides are available in liquid or granular form i.e. loose particles or compressed particles, which may or may not be diluted with water. Copper algaecides are also available in metallic form that may be either ionized or non-ionized.

Depending on the form of the copper algaecide there are various methods one may use to minimize or prevent copper staining including preventing the copper in the algaecide from coming into sustained direct contact with the pool structure. For example, one way to minimize copper staining is to dilute the copper algaecide before it is added to the pool water. That is, if the copper algaecide without dilution is added directly to the main body of water the copper algaecide, which is heavier than water, may settle in the bottom of the pool and cause staining on the bottom of the pool.

Typically, in maintaining bodies of recreational water, such as swimming pools, dispersants are controllably delivered into a swimming pool through a dispenser located in an inline dispensing valve, which is located in a pool water circulation system, or through a floating dispenser, which is located in the open body of water in the swimming pool.

Another type of dispenser is an inline dispenser that contains a dispersant in an open sided cage, which is placed in a swimming pool pump basket. The open sided cage delivers a dispersant into a swimming pool pump basket through a set of end and side openings as the open sided cage can tumble about in a swimming pool pump basket.

SUMMARY OF THE INVENTION

A pool pump basket dispenser metering one or more dispersants with the pool pump basket dispenser having a water mateable surface to support the pool pump basket dispenser in a stable dispensing condition as a dispersant therein is diluted and metered into a stream of pool water as the stream of pool water flows through the pool pump basket.

BRIEF DESCRIPTION OF THE DRAWINGS

FIG. 1 shows a typical prior art swimming pool system with a pool pump that circulates water throughout the swimming pool;

DESCRIPTION OF THE PREFERRED EMBODIMENT

Figure 3:
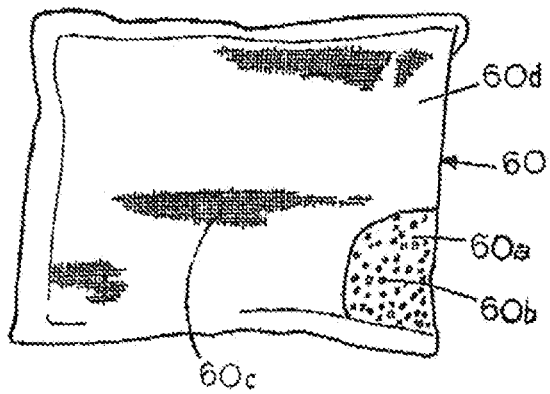
FIG. 3 shows a deformable pool pump dispenser that is water mateable to an internal structural surface of a pool pump basket.

One aspect of maintaining a swimming pool is to avoid the growth or outbreak of algae in the pool water i.e. an algae bloom, which one can avoid by adding an algaecide to the pool water. One of the most effective algaecides is copper, which may be combined with a chelating agent to decrease staining.

One of the challenges with using copper, as an algaecide, for example copper sulfate, is to avoid unsightly copper stains on the pool structure since copper can stain the pool structure if copper is allowed to remain in contact with the pool structure. Other factors can cause copper staining including improper water balance, for example if the pH of the pool water is to high.

Typically, copper algaecides are available in liquid or granular form i.e. loose particles or compressed particles, which may or may not be diluted with water. Copper algaecides are also available in metallic form that may be either ionized or non-ionized.

Depending on the form of the copper algaecide there are various methods one may use to minimize or prevent copper staining including preventing the copper in the algaecide from coming into sustained direct contact with the pool structure. For example, one way to minimize copper staining is to dilute the copper algaecide before it is added to the pool water. That is, if the copper algaecide is added directly to the main body of water the copper algaecide, which is heavier than water, may settle in the bottom of the pool and cause staining on the bottom of the pool.

FIG. 1 shows a typical prior art swimming pool 10 with a body of water 10a and a water circulation system, which includes a set of water outlets comprising a skimmer 12 and a drain 13 that directs pool water into a pool pump 14a. Pool pump, which contains a removable pool pump basket, circulates pool water through the pool pump basket and an inline dispensing valve 14a before returning the water to pool 10 through a water inlet 15 located on a side of pool 10.

Figure 2:
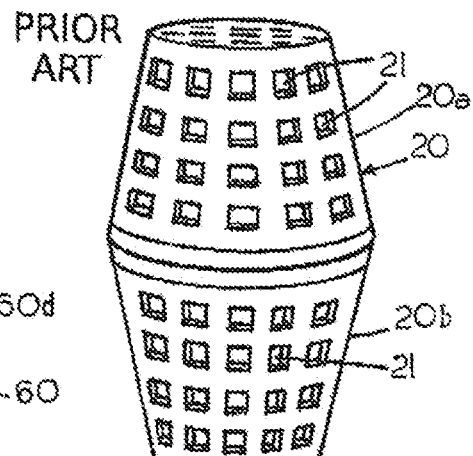
FIG. 2 shows a prior art open sided cage that one drops into a pool pump basket.

FIG. 2 shows a prior art bulging belly dispensing cage 20 with a circular end of a first truncated hollow conical section 20a joined to a circular end of a second truncated hollow conical section 20b to form a dispersant compartment therein. Rows of rectangular shaped openings 21 in cage 20 allow a dispersant therein to escape from within the bulging belly dispensing cage 20. After the belly bulged dispensing cage 20 has been dropped into a pool the cage 20 can tumble about in the pool pump basket as the contents in the cage are released into the water in the pool pump basket.

In one embodiment of the invention the mateable pool pump basket dispenser 60 comprises a flexible fabric water porous immersible algaecide packet 60d that is held in a stable dispensing condition as water flows through the pool pump basket and the algaecide packet 60d.

In another example the algaecide packet 60d comprises a woven mesh bag, for example, a spun fiber mesh bag that allows water to flow into and out of the pores or openings in the algaecide packet when the algaecide packet is located in a pump basket of a swimming pool system. The algaecide packet 60d may take various forms and may include a coating on the outside of the packet comprising a dissolvable material (PVA or the like) to retain the contents within the algaecide packet during shipping and handling of the algaecide packet as well as prior to placing the algaecide packet into a pump basket in a swimming pool circulation system.

In the present invention the dilution of the algaecide in the water porous packet 60d (FIG. 3) becomes controllable by selecting the appropriate water porosity of the packet. That is, the pores or openings in the packet limit or meter water into and out of the packet since the size of the pores as well as the boundary layer proximate the pores provides a flow resistance usable to control the velocity of water into and out of the packet and consequently the rate of the algaecide dispersant into the pool pump basket. The flow resistance of pool pump water through packet 60d provides a further benefit since the flexible packet 60d can be water mateably held in a dispensing condition against a set of openings in a pool pump basket during flow of water through the pool pump basket 25.

Examples of algaecides 60b such as copper metallic material, which are located within the algaecide packet 60d may take various forms including sheets, foil, shot, wire, or ribbon. Alternately, one may impregnate the algaecides 60b directly into the mesh of the algaecide packet 60d.

Location for the algaecide packet is preferably in the pool pump basket 14 of a swimming pool 10, however, in some instances the skimmer basket or leaf catcher basket may be used. In addition, one may install the algaecide packet in a custom built in-line housing, for example, an in-line housing that attaches to a fitting on a return side of the swimming pool water circulation system.

The algaecide packet 60d may contain a float for easy and quick removal of a spent algaecide packet from within the pool circulation system.

While a mesh algaecide packet 60d is described other types of water-mateable packets made from materials such as a flexible or water deformable materials may be used. That is, the packet material needs to permit water to simultaneously flow around and through packet 60d to contact the algaecide therein when the packet 60d is water-mated to a surface of pool pump basket 25 through a flow water though the pool pump basket 25.

To retain the algaecide packet 60d, which is flexible, within the pool circulation system a clip or connector may be used to temporarily secure the algaecide packet to structure within the pool circulation system as water continues to flow through the algaecide pocket.

A further example of an algaecide packet 60d is a coated packet i.e. a dissolvable Poly Vinyl Alcohol (PVA) material located on the exterior of the packet 60d to retain the contents of the algaecide packet during shipping and handling.

Examples of the types of other copper metallic material, which are usable within a pool pump dispenser such as algaecide packet 60d, includes copper in a variety of forms, for example, copper in sheet, foil, shot, wire or ribbon form.

In some cases the locations for the algaecide packet may be in locations other than the pump basket such as a skimmer basket, a leaf catcher basket, a purpose-built algaecide cartridge in-line housing or a purpose built housing that attaches to one of the return fittings on the pool circulation system.

In the example of the algaecide packet 60d describe herein the algaecide packet may contain an algaecide and a cocktail of chelators located therein to allow pool water flow into and out of the algaecide packet as the algaecide packet is restrained within a pool pump basket i.e. water mated within a pump basket in a swimming pool circulation system caused by a combination of the flexibility of the packet and the forces on the packet generated from the flow of water through a pool pump basket and the packet within the pool pump basket.

One example of an algaecide packet 60b to destroy algae and limit copper staining in a swimming pool includes copper sulfate pentahydrate and a zinc sulfate monohydrate plus a cocktail of at least two chelators wherein the chelators are selected from the group consisting of zinc sulfate, ethylenediamine tetraacetic acid (EDTA), sodium gluconate, triethanolamine hydrochloride and, citric acid.

Another example of an algaecide packet with a cocktail of chelators suitable to destroy algae and limit copper staining comprises an algaecide packet that contains 50% Copper Sulfate Pentahydrate by weight and 10% Zinc Sulfate by weight, where the cocktail of chelators comprises 10% ethylenediamine tetraacetic acid (EDTA) by weight, 10% Sodium Gluconate by weight, 10% Triethanolamine Hydrochloride by weight, and 10% Citric Acid by weight. Other features of the algaecide packet 60d described herein may include a float within the algaecide packet for easy removal of a spent algaecide packet from a pool circulation system.

The algaecide packet 60d described herein may include a clip that allows the algaecide packet be retained within other parts of the system, for example by attaching the algaecide packet to the skimmer basket handle or a lip of a pump basket.

A benefit of the algaecide packet described herein is that when the packet is placed in a pump basket the packet delivers or meters a slow release of a chelated copper-based algaecide that is mixed with and diluted by the pool water in the pump basket. Consequently, by the time the water diluted algaecide reaches the main area of the pool the chances of staining the pool are substantially diminished or eliminated. A feature of the invention is that the porosity of the packet may be used to control or limit the velocity or the amount of water that flows through the algaecide packet and hence a dispersant rate of a copper containing algaecide.

In one example of the invention described herein the algaecide packet hinders and prevents copper staining by addition of a source of copper ions and cocktail of chelators where all of the active contents of the algaecide packet are in powder form.

The all-solid powder ingredients in in algaecide packet, may include solid triethanolamine hydrochloride instead of the more commonly used liquid triethanolamine. The all-solid or powder ingredients provide a cost-effective manufacturing process since the solid triethanolamine hydrochloride eliminates the steps of dissolving and drying the ingredients of the contents of the algaecide packet.

A further benefit of the algaecide packet described herein is that one can include a mineral based sanitizer in conjunction with an algaecide packet to simultaneously provide the benefits of both a sanitization agent and algaecide, which may be in a single dispenser.

Figure 4:
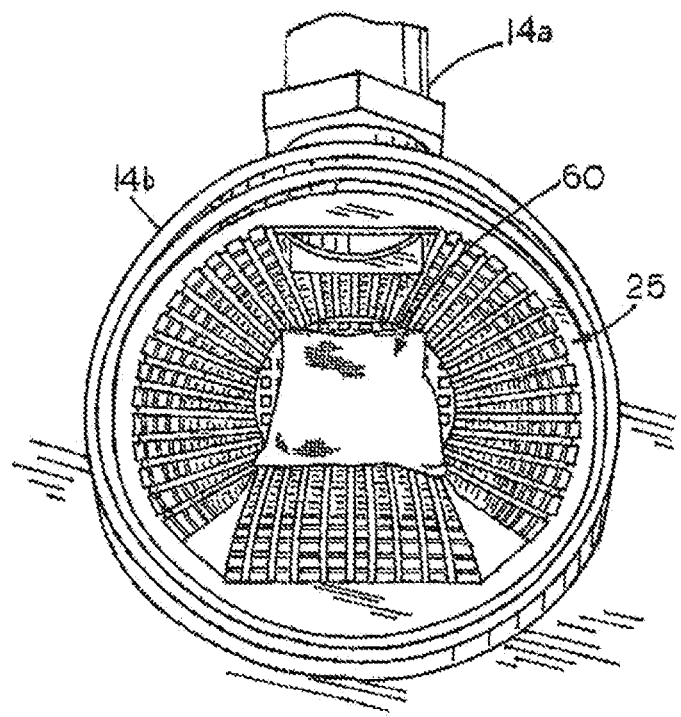
FIG. 4 shows the deformable pool pump dispenser of FIG. 3 mated to an interior surface of the pool pump basket.

FIG. 4 shows a pool pump water-mateable dispenser 60, i.e. a water deformable algaecide dispenser 60, which may be a porous fabric, which comprises a water porous immersible algaecide packet 60*d* containing a copper based algaecide 60*b* and a cocktail of chelators 60*a* with the algaecide packet 60*d* placeable in a water mating condition in a swimming pool pump basket to mix copper ions from a copper based algaecide 60*b* and the chelators 60*a* into the water flowing though the pool pump basket 25 to minimize staining of the pool structure as the pump circulates pool water through the swimming pool water circulation system as shown in FIG. 1.

FIG. 4 shows the pool pump water-mateable dispenser 60 in a water-mated condition at a bottom of the swimming pool pump basket 25. The water-mateable dispenser 60 is held in position through water pressure created by the resistance to water flowing through the fabric or material of the dispenser 60 and the dispersants 60*a* and 60*b* located in dispenser 60. That is, a particle and fabric resistance of the water-mateable dispenser 60. In this example the dispenser 60, which includes dispersants such as an algaecide 60*b* that includes a source of copper ions and a cocktail of chelating agents 60*a*, to forms a water porous packet 60*d* that is placeable within a swimming pool water circulation system to deliver copper ions throughout the swimming pool while minimizing or preventing copper ions in the algaecide from staining the pool structure.

In another example one may minimize copper staining by diluting the copper based algaecide and slowly metering the copper based algaecide into the pool water at a location upstream of a water pump impellor on the pool circulation system thereby mixing copper algaecide with the pool water and thus diluting the copper algaecide before it flows through the external structure of the pool recirculation system. While mixing and diluting the algaecide 60*b* can ideally be performed by placing water-mateable dispenser 60 in a pool pump basket of the swimming pool, the dispenser 60 is not limited to placement in the pool pump basket as long as water can flow through packet 60*d*.

In the example shown the water-mateable dispenser 60 may contain a copper based algaecide and a cocktail of chelators thereby forming an algaecide packet 60*d* placeable directly in a swimming pool pump basket 25 to mix copper ions from the copper based algaecide and the chelators 60*b* into the pool water to minimize staining of the pool structure as the pool pump 14 circulates pool water through the swimming pool water circulation system and the water-mateable dispenser 60, which is located in the swimming pool pump basket. The algaecide 60*b* including a source of copper ions and a cocktail of chelating agents 60*a* that are contained in a flexible water-mateable mateable dispenser 60 namely, a flexible water mateable porous packet 60*d* placeable within a pool pump basket 25. The suction from the pool pump 14 holding water-mateable dispenser 60 in a stable water-mateable contact with a portion of the porous pool pump basket 61 to avoid uneven dispensing due to tumbling of the water-mateable dispenser 60 in the pool pump basket.

During pump operation pump 14, of the pool water circulation system (as shown in FIG. 1), delivers copper ions throughout the swimming pool while minimizing or preventing the copper ions in the algaecide from staining the pool structure by in situ diluting the copper based algaecide within the algaecide packet 60*d* and slowly metering the diluted copper based algaecide into the pool water through the porous sides of water-mateable dispenser 60, which is at a location upstream of a water pump impellor on a pool circulation system. Thus, the invention described herein enables one to mix and dilute the copper algaecide with the pool water before the copper algaecide flows through the external structure of the pool recirculation system and into the swimming pool thereby minimizing or eliminating staining of the pool structure.

In the example shown in FIG. 3 and FIG. 4 the pool pump water mateable basket dispenser 60 comprises a packet 60*d* having a porous water porous flexible fabric 60*c* forming a compartment therein that contains an algaecide 60*b* and chelators 60*a* that are confined within the compartment formed by the water porous flexible fabric 60*c*. In this example the water-mateable dispenser 60 (i.e. packet 60*d*) is placeable in a dispensing condition within a pool pump basket with the water porous flexible packet 60*d* having sufficient porosity and flexibility to allow water to be drawn through the flexible fabric 60*c* and the algaecide 60*b* therein as a stream of water is sucked though the pool pump basket 25 by a pump located downstream of the pool pump basket 25.

In this example the porosity of the fabric 60*c* and the velocity of the water through the pool pump basket 25 can be adjusted to ensure that the algaecide therein is properly mixed. Thus, selecting the appropriate water porosity of fabric 60*c* can be used to control the dispensing rate when water mateable dispenser 60 is held in a water mateable condition in a pool pump basket. That is, the pores or openings in the packet fabric 60*c* function to meter water into and out of the packet 60*d* during water flow therethrough since the size of the pores as well as the boundary layer proximate the pores or openings in fabric 60*c* provide a flow resistance that can be used to control the velocity of water into and out of packet 60*d* and consequently the rate of the algaecide dispensed into pool pump basket 25.

An example of an algaecide for use in water-mateable dispenser 60 is a dry copper algaecide 60*b*. In this example water-mateable dispenser 60 comprises a rectangular packet 60*d* that is supportable in a water-mated dispensing condition in a pool pump basket through water pressure that deforms the packet 60*d* to maintain the packet in stable dispensing condition. That is, a flow deformation of the packet 60*d* causes the packet 60*d* to remain in a stable dispensing condition through an interlocking engagement of flexible fabric 60*c* of packet 60*d* with a web structure of the pool pump basket.

Preferable, at least a portion of the flexible fabric 60*c* of water-mateable dispenser 60 has pores or openings sufficient large therein for ingress and egress of water through the fabric 60*c* of packet 60*d* to thereby disseminate algaecide 60*b* in a diluted condition into a stream of water flowing through the pool pump basket while also preventing undiluted algaecide in packet 60*d* from flowing out of the water-mateable dispenser 60.

In another example water-mateable dispenser 60, which comprises an algaecide packet 60*d*, may be a woven mesh bag with an algaecide therein, for example, a spun fiber mesh bag that allows water to flow into and out of the pores or openings in the algaecide packet 60*d* when the algaecide packet is located in a swimming pool system. The water-mateable dispenser 60 may take various other forms and may include a coating on the outside of an algaecide packet 60*d* where the coating comprises a dissolvable material (PVA or the like) to retain the contents within the algaecide packet 60*d* during shipping and handling of the algaecide packet as well as prior to placing the algaecide packet into a pool pump basket in a swimming pool circulation system.

Examples of algaecides such as copper metallic material located within the algaecide packet 60d make take various forms including sheets, foil, shot, wire, or ribbon. Alternately, one may impregnate the algaecide directly into the mesh of the algaecide packet 60d.

As described herein the location for the algaecide packet 60d is preferably the pool pump basket of a swimming pool, however, the skimmer basket or leaf catcher basket may be used in certain pool systems. In addition, one may install the algaecide packet 60d in a custom built in-line housing, for example, an in-line housing that attaches to a fitting on a return side of the swimming pool water circulation system.

The algaecide packet 60d may contain a float for easy and quick removal of a spent algaecide packet from within the pool circulation system.

While a mesh flexible algaecide packet 60d is described other types of algaecide packets may include, for example, a polymer plastic housing to permit water to flow around and through openings in the housing to contact the algaecide therein.

To retain the algaecide packet 60d within the pool circulation system a clip or connector may be used to temporarily secure the algaecide packet to structure within the pool circulation system.

A further example of an algaecide packet 60d is a coated packet i.e. a dissolvable (polyvinyl acetate) or other material, which is located on an exterior face of the algaecide packet 60d to retain the powder contents of the algaecide packet during shipping and handling.

Examples of the type of copper metallic material usable within an algaecide cartridge or algaecide packet 60d includes copper in a variety of forms including copper in sheet, foil, shot, wire or ribbon form.

In some cases the locations for the algaecide packet 60d may be in locations other than the pump basket such as a skimmer basket, a leaf catcher basket, a purpose-built algaecide cartridge in-line housing or a purpose built housing that attaches to one of the return fittings on the pool water circulation system.

In the example of the algaecide packet 60d describe herein the algaecide packet preferably contains an algaecide and a cocktail of chelators located therein to allow pool water flow into and out of the algaecide packet as the algaecide packet is typically restrained within a pump basket in a swimming pool circulation system though the water mateable feature of dispenser 60.

In one example an algaecide packet 60d, which can be used to destroy algae and limit copper staining in a swimming pool, includes copper sulfate pentahydrate and zinc sulfate monohydrate and a cocktail of at least two chelators wherein the chelators are selected from the group consisting of, ethylenediamine tetraacetic acid (EDTA), sodium gluconate, triethanolamine hydrochloride and, citric acid.

An example of an algaecide packet 60d with a cocktail of chelators suitable to destroy algae and limit copper staining comprises an algaecide packet that contains 50% Copper Sulfate Pentahydrate by weight where the cocktail of chelators comprises 10% Zinc Sulfate by weight, 10% ethylenediamine tetraacetic acid (EDTA) by weight, 10% Sodium Gluconate by weight, 10%, Triethanolamine Hydrochloride by weight, and 10% Citric Acid by weight.

Other features of the algaecide packet 60d may include a float within the algaecide packet for easy removal of a spent algaecide packet from the pool circulation system.

Still other features of the algaecide packet 60d described herein may include a clip to restrain the algaecide packet by attaching the algaecide packet 60d in a water mateable condition on a skimmer basket handle or a lip of a pool pump basket.

A benefit of the water mateable algaecide packet 60d described herein, which is placed in a pump basket, is that the algaecide packet 60d delivers a slow release of a chelated copper-based algaecide that is mixed and diluted by the pool water in the pump basket so that when the diluted algaecide reaches the main area of the pool the chances of staining the pool are prevented or substantially diminished.

In one example the algaecide packet 60d hinders and prevents copper staining via addition of a source of copper ions and a cocktail of chelators in the algaecide where all of the active contents of the algaecide packet are in powder form.

An all-solid powder ingredients in in algaecide packet 60d, may include solid triethanolamine hydrochloride instead of the more commonly used liquid triethanolamine. The all-solid or powder ingredients provide a cost-effective manufacturing process since the solid triethanolamine hydrochloride eliminates the steps of dissolving and drying the ingredients of the contents of the algaecide packet 60d.

A further benefit of the algaecide packet 60d described herein is that one can include a mineral based sanitizer in conjunction with an algaecide packet to simultaneously provide the benefits of both a sanitization agent and an algaecide, which may be in a single dispenser.

Thus, in a swimming pool dispensing system one can including an algaecide located within a packet 60d containing a copper algaecide wherein the packet 60d resides in a pump basket of a water circulation system of a swimming pool.

In some examples packet 60d can contain an algaecide/clarifier/flocculent composition that is all-solid powder that can be compressed into either a pellet or a tablet for insertion into a pool pump basket.

In other examples packet 60d can be part of an algaecide/clarifier/flocculent delivery method that consist of adding a first liquid chelator to a swimming pool and a powder algaecide to a pump basket or adding a first liquid chelator to a swimming pool and a powder algaecide to a skimmer basket. Alternately, a combination algaecide/clarifier/flocculent product can be formed consisting of both a copper algaecide and a silver sanitizer as a single mixed all-solid product.

A further feature of the flexible deformable packet 60d is that one can control pump flow rate to control the amount or rate of dispensing the algaecide into the pool thereby allowing one to use a variety of algaecides since the water mateable packet can maintain its dispensing position as the water flow therethrough is increased or decreased.

Test Results

To test the effectiveness of a deformable water-mateable dispenser a set of 5 in×5 in fabric packets were made from Polypoint 200 HEM, Spun, Spunbound Pointbond Polyester, 15-Micron rating (supplied by Hanes Engineered Materials of Sharonville Ohio)

The contents of the field-tested water-mateable packets were as follows:
  Copper Sulfate Pentahydrate (50% by weight)
  Zinc Sulfate (clarifier 10% by weight)
  Ethyelenediaminetetraccetic acid (chelant 10% by weight)
  Triethanolamine (chelant 10% by weight)
  Citric Acid (chelant 10% by weight)
  Sodium Gluconate (chelant 10% by weight)

For 15,000-gallon pools the water-mateable packet size was 5 in×5 in when empty and 4 in×4 in×1 in when filled with the above contents.

For 15,000-gallon pools the water-mateable packet size was 5 in×7.5 in when empty and 3.5 in×6 in×1.5 in when filled with the above contents.

The packets were placed in the pool pump basket of 750 different pools up to 25,000 gallons. No algae outbreaks or staining were reported during a 6-month test period.

We claim:

1. A swimming pool system comprising:
a swimming pool;
a skimmer basket in said swimming pool for separating an article of debris from a stream of pool water flowing through the skimmer basket and into a pool water circulation line;
a pool pump basket having a plurality of openings therein, said pool pump basket located on an inlet side of a pool pump in the pool water circulation line;
a water deformable algaecide dispenser located in the pool pump basket with the water deformable algaecide dispenser having a set of openings therein to permit flow of the pool water therethrough, said algaecide dispenser having an external water-mateable surface mateable to an internal surface of the pool pump basket in response to a water pressure exerted by the pool water being drawn through the algaecide dispenser in the pool pump basket while allowing water and debris to move within the pool pump basket;
an algaecide located in said algaecide dispenser; and
the pool pump having an inlet for drawing the pool water into the pool water circulation line and through the algaecide in the algaecide dispenser before releasing the pool water with the algaecide in a diluted condition into the swimming pool through the pool water circulation line.

2. The swimming pool system of claim 1 wherein the algaecide dispenser comprises a flexible porous fabric packet that conforms to a shape of the pump basket as water flows through the pool pump basket and the flexible porous fabric packet to restrain the algaecide dispenser therein.

3. The swimming pool system of claim 1 where the algaecide comprises a source of copper and a plurality of chelators.

4. The swimming pool system of claim 1 wherein the algaecide comprises copper and is provided together with a silver sanitizer in a single mixed all-solid product.

5. A pool pump basket dispenser comprising:
a pool pump basket, the pool pump basket having a web structure bounding a plurality of openings through which water can flow, the pool pump basket having a bottom and a sidewall, the sidewall extending upwardly from the bottom of the pool pump basket, with the web structure bounding the plurality of openings being at both the bottom and sidewall of the pool pump basket, such that the plurality of openings includes both: (i) openings in the bottom of the pool pump basket, and (ii) openings in the sidewall of the pool pump basket;
a water porous flexible fabric packet having a dispersant compartment therein; and
an algaecide located within an algaecide compartment in said water porous flexible fabric packet, said water porous flexible packet placed directly in the pool pump basket and retained in a dispensing condition within the pool pump basket with said water porous flexible fabric packet having sufficient porosity to allow a stream of water to be drawn through the fabric packet and the algaecide therein as the stream of water is sucked through the pool pump basket by a pump located downstream of the pool pump basket, said stream of water mateably maintaining the flexible fabric packet stably against an internal surface of the pool pump basket through an interlocking engagement of flexible fabric of the packet with the web structure of the pool pump basket as the algaecide is metered into a swimming pool in a water diluted condition as the stream of water flows through the algaecide located within the water porous flexible fabric packet.

6. The pool pump basket dispenser of claim 5 wherein the algaecide is a dry copper algaecide.

7. The pool pump basket dispenser of claim 5 wherein the water porous flexible fabric packet contains a chelator.

8. The pool pump basket dispenser of claim 5 wherein at least a portion of said flexible fabric packet has pores therein for ingress and egress of water through the packet with the egress of water carrying diluted algaecide into a stream of water flowing through the pool pump basket and into the swimming pool while preventing release of the algaecide in an undiluted condition.

9. The pool pump basket dispenser of claim 5 wherein the algaecide comprises a plurality of granular particles.

10. The pool pump basket dispenser of claim 5 wherein the algaecide comprises copper and is provided together with a silver sanitizer in a single mixed all-solid product.

11. The pool pump basket dispenser of claim 5 wherein the internal surface of the pool pump basket against which the flexible fabric packet is stably retained is defined by the bottom of the pool pump basket, such that the pool pump basket dispenser is configured to pass water flow through the algaecide located within the water porous flexible fabric packet and then through the openings in the bottom of the pool pump basket.

12. The pool pump basket dispenser of claim 5 wherein the flexible fabric packet is stably retained against both the bottom and sidewall of the pool pump basket.

13. The pool pump basket dispenser of claim 5 wherein the flexible fabric packet is in the form of a rectangular packet and the bottom of the pool pump basket has a circular shape.

14. An algaecide packet for placement in a pump basket of a swimming pool water circulation system, the algaecide packet comprising:
a water porous fabric to allow water to flow into and out of the algaecide packet when the algaecide packet is located in the pump basket of the swimming pool water circulation system; and
an algaecide located in the packet, where the algaecide contains copper sulfate pentahydrate together with zinc sulfate monohydrate and at least two chelators selected from the group consisting of ethylenediamine tetraacetic acid (EDTA), sodium gluconate, triethanolamine hydrochloride, and citric acid.

15. The algaecide packet of claim 14 where the algaecide packet contains 50% copper sulfate pentahydrate by weight, 10% zinc sulfate monohydrate by weight, 10% ethylenediamine tetraacetic acid (EDTA) by weight, 10% sodium gluconate by weight, 10% triethanolamine hydrochloride by weight, and 10% citric acid by weight.

16. The algaecide packet of claim 14 wherein the algaecide packet includes a coating that retains powder contents within the algaecide packet during shipping and handling but that dissolves when the algaecide packet is used in the pump basket of the swimming pool water circulation system.

17. The algaecide packet of claim 14 wherein the algaecide consists of a single mixed all-solid product.

18. A swimming pool dispensing system including an algaecide located within a mesh bag, the algaecide comprising copper, wherein the mesh bag resides in a water mateable condition in a pump basket of a water circulation system of a swimming pool, the swimming pool dispensing system including an algaecide/clarifier/flocculant composition comprising an all-solid powder mixture including a powder form of a chelate triethanolamine hydrochloride.

19. A swimming pool dispensing system including an algaecide located in a water deformable algaecide packet, the algaecide comprising copper, the water deformable algaecide packet configured to be water mated in a pump basket of a water circulation system of a swimming pool, such that the swimming pool dispensing system includes an algaecide/clarifier/flocculant composition produced by an all-solid powder mixture, including a powder form of a chelate triethanolamine hydrochloride, being compressed into a tablet or pellet.

* * * * *